(12) United States Patent
Muldal et al.

(10) Patent No.: US 11,131,460 B2
(45) Date of Patent: Sep. 28, 2021

(54) LEAN BURN FUEL INJECTOR

(71) Applicant: ROLLS-ROYCE plc, London (GB)

(72) Inventors: Carl L. Muldal, Derby (GB); Luca Tentorio, Derby (GB); Hua Wei Huang, Nottingham (GB); Juan Carlos Roman Casado, Derby (GB)

(73) Assignee: Rolls-Royce PLC, London (GB)

( * ) Notice: Subject to any disclaimer, the term of this patent is extended or adjusted under 35 U.S.C. 154(b) by 104 days.

(21) Appl. No.: 16/276,669

(22) Filed: Feb. 15, 2019

(65) Prior Publication Data

US 2020/0025386 A1 Jan. 23, 2020

(30) Foreign Application Priority Data

Mar. 7, 2018 (GB) ..................................... 1803650

(51) Int. Cl.
  *F23R 3/34* (2006.01)
  *F02K 9/50* (2006.01)
  *F23R 3/14* (2006.01)
(52) U.S. Cl.
  CPC .............. *F23R 3/343* (2013.01); *F02K 9/50* (2013.01); *F23R 3/14* (2013.01)
(58) Field of Classification Search
  CPC .... F23R 3/14; F23R 3/286; F23R 3/20; F23R 3/28; F23R 3/343; F23R 2900/03014;
  (Continued)

(56) References Cited

U.S. PATENT DOCUMENTS 8,297,057 B2 10/2012 Toon
8,365,531 B2 2/2013 Pidcock et al.
(Continued)

FOREIGN PATENT DOCUMENTS

CN 104406196 A 11/2015
EP 1719950 A2 11/2006
(Continued)

OTHER PUBLICATIONS

Great Britain search report dated Sep. 5, 2018, issued in GB Patent Application No. 1803650.9.
(Continued)

*Primary Examiner* — Ehud Gartenberg
*Assistant Examiner* — Jacek Lisowski
(74) *Attorney, Agent, or Firm* — Shumaker & Sieffert, P.A.

(57) ABSTRACT

A lean burn fuel injector has a head which has a coaxial arrangement of an inner pilot air-blast fuel injector and an outer main air-blast fuel injector. The pilot fuel injector comprises coaxially arranged inner and outer air swirler passages. The main fuel injector comprises coaxially arranged inner and outer air swirler passages. A first splitter is arranged between the passages. The first splitter has a conical divergent downstream portion. A second splitter is arranged radially within and spaced from the first splitter. The second splitter has a conical convergent portion and a conical divergent downstream portion. The downstream end of the second splitter is upstream of the downstream end of the first splitter. A connecting member connects the downstream end of the second splitter and the downstream portion of the first splitter upstream of the downstream end of the first splitter to form a sharp edge.

19 Claims, 4 Drawing Sheets

(58) Field of Classification Search
CPC .. F23R 2900/03042; F23R 2900/03043; F23R 2900/03044; F23C 7/004; F23D 11/103; F23D 11/105; F23D 11/107; F23D 11/383; F23D 2900/14021; F23D 2900/14701
See application file for complete search history.

(56) References Cited

U.S. PATENT DOCUMENTS

| | | | | |
|---|---|---|---|---|
| 8,387,391 | B2* | 3/2013 | Patel | F23R 3/28 60/740 |
| 8,973,368 | B2* | 3/2015 | Dai | F23R 3/286 60/748 |
| 2005/0279862 | A1* | 12/2005 | Mao | F23R 3/14 239/403 |
| 2007/0289305 | A1* | 12/2007 | Oda | F23D 11/383 60/748 |
| 2008/0302105 | A1* | 12/2008 | Oda | F23R 3/343 60/737 |
| 2010/0050644 | A1* | 3/2010 | Pidcock | F23D 11/107 60/737 |
| 2010/0308135 | A1 | 12/2010 | Yamamoto et al. | |
| 2015/0082797 | A1* | 3/2015 | Matsuyama | F23R 3/18 60/746 |

FOREIGN PATENT DOCUMENTS

| | | |
|---|---|---|
| EP | 2497922 A2 | 9/2012 |
| EP | 2703720 | 3/2014 |
| EP | 3104080 | 12/2016 |
| GB | 2456147 A | 7/2009 |
| JP | 2009074798 A | 9/2004 |
| WO | 2008071902 | 6/2008 |

OTHER PUBLICATIONS

Extended European Search Report from counterpart EP Application No. 19156001.0 dated Jun. 27, 2019, 7 pgs.
Response to Extended European Search Report from counterpart EP Application No. 19156001.0 dated Jun. 27, 2019, filed Mar. 11, 2020, 32 pgs.

* cited by examiner

LEAN BURN FUEL INJECTOR

CROSS-REFERENCE TO RELATED APPLICATIONS

This specification is based upon and claims the benefit of priority from UK Patent Application Number 1803650.9 filed on 7 Mar. 2018, the entire contents of which are incorporated herein by reference.

BACKGROUND

Technical Field

The present disclosure concerns a lean fuel injector and in particular to a lean burn fuel injector for a gas turbine engine combustion chamber.

Description of the Related Art

A current lean burn fuel injector comprises a fuel injector head having a coaxial arrangement of an inner pilot air-blast fuel injector and an outer main air-blast fuel injector and the outer main air-blast fuel injector is arranged coaxially radially outwardly of the inner pilot air-blast fuel injector. The inner pilot air-blast fuel injector comprises a coaxial arrangement of a pilot inner air swirler passage and a pilot outer air swirler passage. The outer main air-blast fuel injector comprises a coaxial arrangement of a main inner air swirler passage and a main outer air swirler passage. A main fuel supply passage is arranged to supply main fuel to the main inner air swirler passage and a pilot fuel supply passage is arranged to supply pilot fuel into the pilot inner air swirler passage.

The lean burn fuel injector is designed so that the mixture of pilot fuel and air from the inner pilot air-blast fuel injector is sufficiently radially spaced from the mixture of main fuel and air from the outer main air-blast fuel injector to provide low power efficiency. If the mixture of pilot fuel and air from the inner pilot air-blast fuel injector is too separated from the mixture of main fuel and air from the outer main air-blast fuel injector the efficiency of the main air-blast fuel injector is compromised. If the mixture of pilot fuel and air from the inner pilot air-blast fuel injector is too close to, to become mixed with, the mixture of main fuel and air from the outer main air-blast fuel injector the high power emissions performance is poor.

In some lean burn fuel injectors an intermediate air swirler passage is located coaxially and radially between the pilot outer air swirler passage and the main inner air swirler passage. The intermediate air swirler passage is defined between a first splitter which has a frusto-conical divergent downstream portion and a second splitter which has a frusto-conical convergent downstream portion. The first and second splitters are arranged radially between the pilot outer air swirler passage and the main inner air swirler passage and the second splitter is spaced radially inwardly from the first splitter. The first splitter separates the mixture of pilot fuel and air from the inner pilot air-blast fuel injector from the mixture of main fuel and air from the outer main air-blast fuel injector. The first and second splitters enable an S-shaped recirculation zone to form more consistently and the second splitter provides a region for flame stabilisation.

The second splitter suffers from overheating due to flame stabilisation thereon and even though the second splitter is cooled it may oxidise, reduce the diameter at the downstream end of the frusto-conical convergent downstream portion and hence affect the S-shaped recirculation zone and the region for flame stabilisation.

The present disclosure seeks to provide a lean burn fuel injector which reduces, or overcomes, the above mention problem(s).

SUMMARY

According to a first aspect of the present disclosure there is provided a lean burn fuel injector comprising a fuel feed arm and a fuel injector head, the fuel feed arm having a pilot fuel supply passage extending there-through and a main fuel supply passage extending there-through, the fuel injector head having a coaxial arrangement of an inner pilot air-blast fuel injector and an outer main air-blast fuel injector, the outer main air-blast fuel injector being arranged coaxially radially outwardly of the inner pilot air-blast fuel injector, the inner pilot air-blast fuel injector comprising, in order radially outwardly, a coaxial arrangement of a pilot inner air swirler passage and a pilot outer air swirler passage, the pilot fuel supply passage being arranged to supply pilot fuel into at least one of the pilot inner air swirler passage and the pilot outer air swirler passage, the outer main air-blast fuel injector comprising, in order radially outwardly, a coaxial arrangement of a main inner air swirler passage and a main outer air swirler passage, the main fuel supply passage being arranged to supply main fuel into at least one of the main inner air swirler passage and/or the main outer air swirler passage, a first splitter member being arranged radially between the main inner air swirler passage and the pilot outer air swirler passage, the first splitter member having a frusto-conical divergent downstream portion, a second splitter member being arranged radially within and spaced radially from the first splitter member, the second splitter member comprising a frusto-conical convergent portion and a frusto-conical divergent downstream portion, a downstream end of the second splitter member being arranged upstream of a downstream end of the first splitter member, a connecting member arranged to extend from the downstream end of the second splitter member to the frusto-conical divergent downstream portion of the first splitter member upstream of the downstream end of the first splitter member and the frusto-conical divergent downstream portion of the second splitter and the connecting member being arranged to form a sharp edge.

The frusto-conical divergent downstream portion of the second splitter and the connecting member may be arranged at an angle of 90° or less to form the sharp edge.

The frusto-conical divergent downstream portion of the first splitter and the connecting member may be arranged at an angle of 90° and the frusto-conical divergent downstream portion of the second splitter and the connecting member may be arranged at an angle of 90° to form the sharp edge.

The frusto-conical divergent downstream portion of the second splitter and the frusto-conical divergent downstream portion of the first splitter may be arranged parallel to each other.

The connecting member may be provided with apertures to supply coolant over at least one of a downstream surface of the connecting member and the frusto-conical divergent downstream portion of the first splitter.

The axes of the apertures may be arranged parallel to, or are arranged to intersect, a radially inner surface frusto-conical divergent downstream portion of the first splitter.

The axes of a first set of apertures closer to the first splitter may be arranged parallel to a radially inner surface of the frusto-conical divergent downstream portion of the first splitter and a second set of apertures further to the first splitter are arranged to intersect the radially inner surface of the frusto-conical divergent downstream portion of the first splitter.

The frusto-conical divergent downstream portion of the second splitter may be provided with apertures to supply coolant over a radially inner surface of the frusto-conical divergent downstream portion of the second splitter.

The second splitter may have a cylindrical upstream portion, the frusto-conical convergent portion being arranged axially between the cylindrical upstream portion and the frusto-conical divergent downstream portion, the cylindrical upstream portion being arranged radially around the pilot outer air swirler passage to define an intermediate air swirler passage between the first splitter and the second splitter.

The second splitter may be arranged downstream of an air swirler in the pilot outer air swirler passage, an upstream end of the frusto-conical convergent portion of the second splitter being spaced radially from the first splitter to define an inlet to a chamber between the first splitter and the second splitter.

The pilot fuel supply passage may be arranged to supply pilot fuel into the pilot inner air swirler passage.

A pilot fuel passage may be arranged coaxially between the pilot inner air swirler passage and the pilot outer air swirler passage.

The pilot fuel passage may be arranged to supply pilot fuel onto a pre-filming surface in the pilot inner air swirler passage.

The pilot fuel passage may have a fuel swirler to swirl the pilot fuel supplied onto the pre-filming surface in the pilot inner air swirler passage.

The pilot inner air swirler passage and the pilot outer air swirler passage may be arranged to swirl the air in opposite directions.

The main fuel supply passage being arranged to supply the main fuel into the main inner air swirler passage.

A main fuel passage may be arranged coaxially between the main inner air swirler passage and the main outer air swirler passage.

The main fuel passage may be arranged to supply main fuel onto a pre-filming surface in the main inner air swirler passage.

The main inner air swirler passage and the main outer air swirler passage may be arranged to swirl the air in opposite directions.

The intermediate air swirler passage may be sandwiched between the pilot outer air swirler passage of the inner pilot air-blast fuel injector and the main inner air swirler passage of the outer main air-blast fuel injector.

The fuel injector may be provided in a combustion chamber. The fuel injector may be provided in a gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
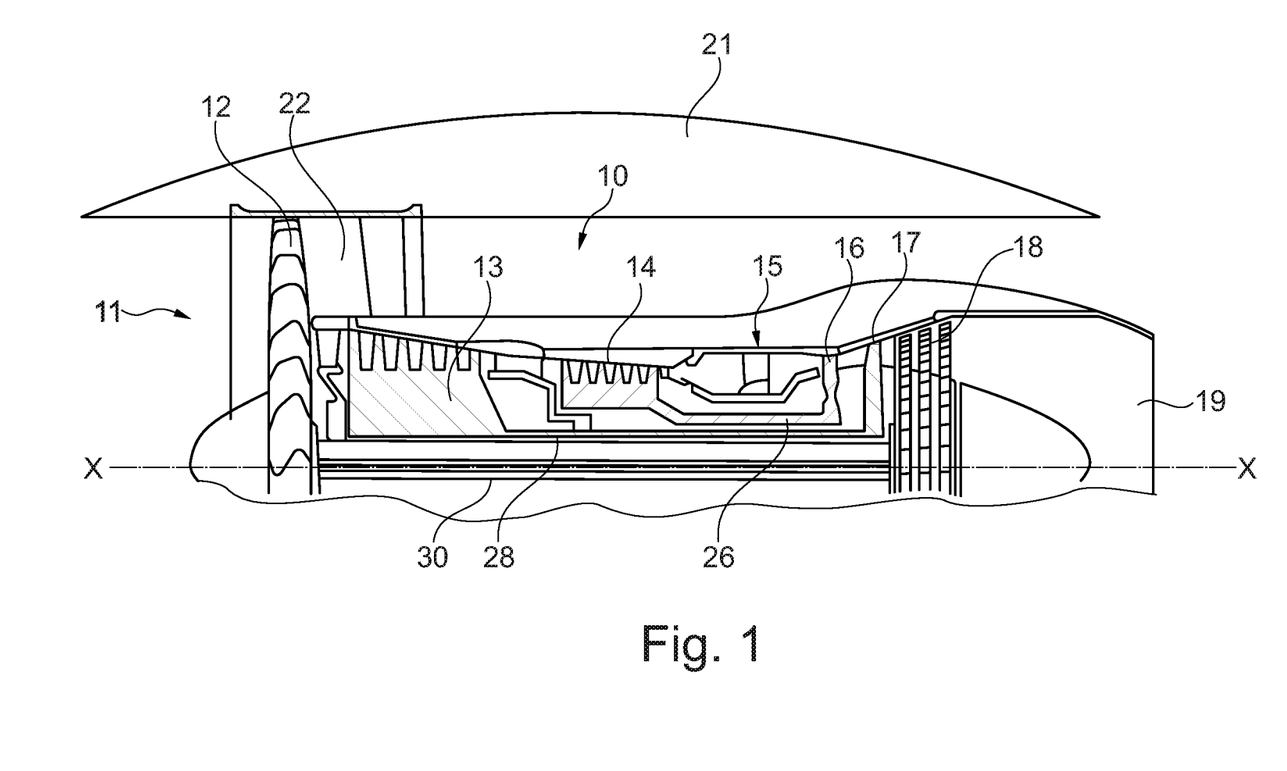
FIG. 1 is a cross-sectional side view of a gas turbine engine.

With reference to FIG. 1, a gas turbine engine is generally indicated at 10, having a principal and rotational axis X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and an exhaust nozzle 19. A nacelle 20 generally surrounds the engine 10 and defines both the intake 11 and the exhaust nozzle 19.

The gas turbine engine 10 works in the conventional manner so that air entering the intake 11 is accelerated by the fan 12 to produce two air flows: a first air flow into the intermediate pressure compressor 13 and a second air flow which passes through a bypass duct 21 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low pressure turbines 17, 18 and 19 respectively drive the high pressure compressor 15, intermediate pressure compressor 14 and the fan 13 respectively, each by a suitable interconnecting shaft 26, 28 and 30 respectively.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
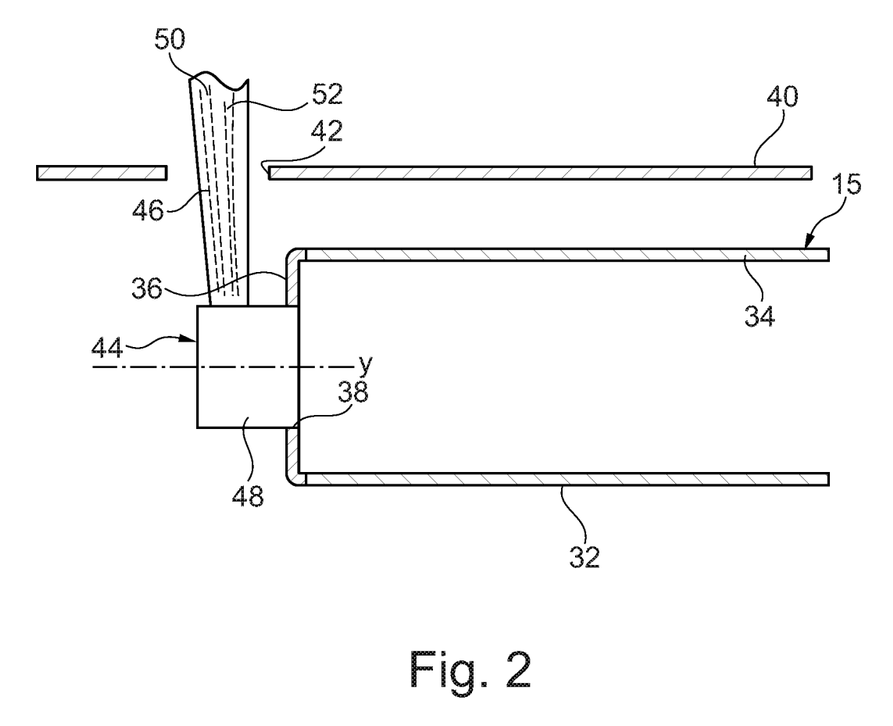
FIG. 2 is an enlarged cross-sectional view of an annular combustion chamber of the gas turbine engine.

The combustion chamber 15 is shown more clearly in FIG. 2. The combustion chamber 15 is an annular combustion chamber and comprises an inner annular wall 32, an outer annular wall 34 and an upstream wall 36. The upstream end wall 36 has a plurality of circumferentially spaced apertures, for example equi-circumferentially spaced apertures, 38. The combustion chamber is surrounded by a combustion chamber casing 40 and the combustion chamber casing 40 has a plurality of circumferentially spaced apertures 42. The combustion chamber 15 also has a plurality of fuel injectors 44 and each fuel injector 40 extends radially through a corresponding one of the apertures 42 in the combustion chamber casing 40 and locates in a corresponding one of the apertures 38 in the upstream end wall 36 of the combustion chamber 15 to supply fuel into the combustion chamber 15.

Figure 3:
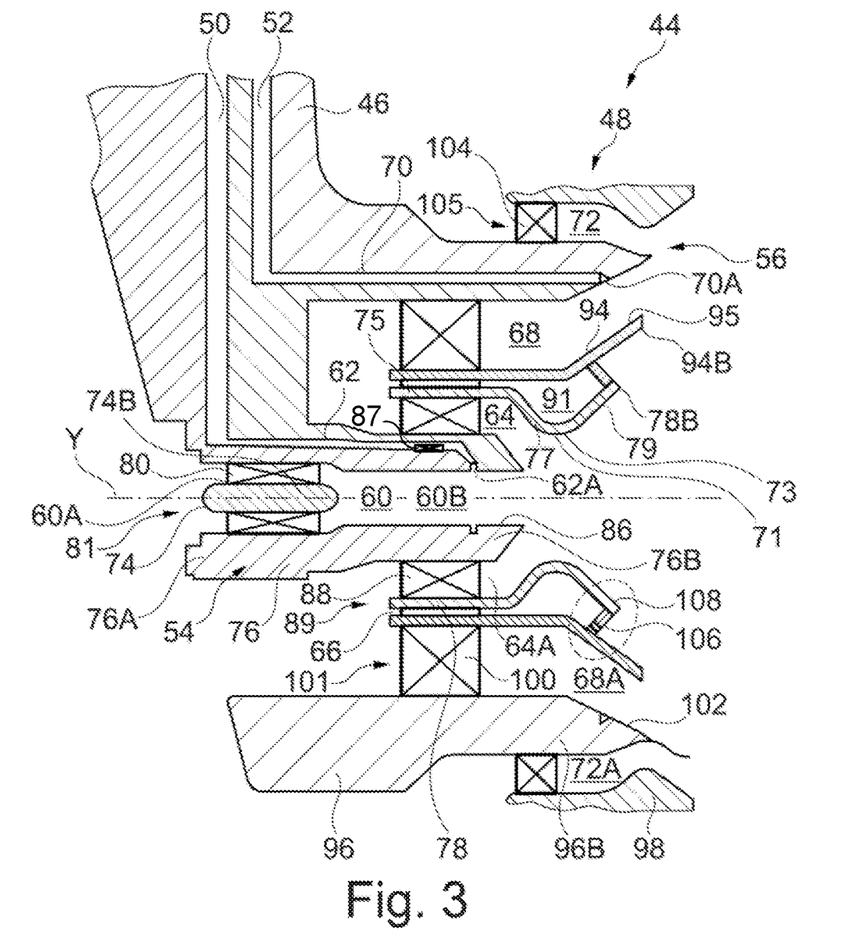
FIG. 3 is a further enlarged cross-section view of a lean burn fuel injector according to the present disclosure.
Figure 3A:
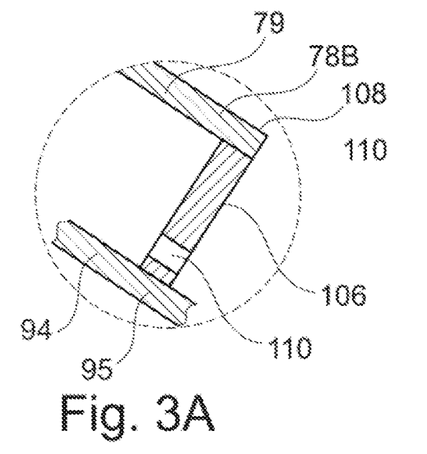
FIG. 3A is an enlarged portion of a part of the lean burn fuel injector shown in FIG. 3.

A lean burn fuel injector 44 according to the present disclosure is shown more clearly in FIGS. 3 and 3A. The fuel injector 44 comprises a fuel feed arm 46 and a fuel injector head 48. The fuel feed arm 46 has a first internal fuel passage, a pilot fuel supply passage, 50 for the supply of pilot fuel to the fuel injector head 48 and a second internal fuel passage, a main supply fuel passage, 52 for the supply of main fuel to the fuel injector head 48. The fuel injector head 48 has an axis Y and the fuel feed arm 46 extends generally radially with respect to the axis Y of the fuel injector head 48 and also generally radially with respect to the axis X of the turbofan gas turbine engine 10. The axis Y of each fuel injector head 48 is generally aligned with the axis of the corresponding aperture 38 in the upstream end wall 36 of the combustion chamber 15.

The fuel injector head 48 has a coaxial arrangement of an inner pilot air-blast fuel injector 54 and an outer main air-blast fuel injector 56. The inner pilot air-blast fuel injector 54 comprises, in order radially outwardly, a coaxial arrangement of a pilot inner air swirler passage 60, a pilot fuel passage 62 and a pilot outer air swirler passage 64. The outer main air-blast fuel injector 56 comprises, in order radially outwardly, a coaxial arrangement of a main inner air swirler passage 68, a main fuel passage 70 and a main outer air swirler passage 72. An intermediate air swirler passage 66 is sandwiched between the pilot outer air swirler passage 64 of the inner pilot air-blast fuel injector 54 and the main inner air swirler passage 68 of the outer main air-blast fuel injector 56.

The fuel injector head 48 comprises a first generally cylindrical member 74, a second generally annular member 76 spaced coaxially around the first member 74 and a third generally annular member 78 spaced coaxially around the second annular member 76. A plurality of circumferentially spaced swirl vanes 80 extend radially between the first member 74 and the second annular member 76 to form a first air swirler 81. The second annular member 76 has a greater axial length than the first member 74 and the first member 74 is positioned at an upstream end 76A of the second annular member 76 and a generally annular duct 60A is defined between the first member 74 and the second annular member 76 and the swirl vanes 80 extend radially across the annular duct 60A. A generally cylindrical duct 60B is defined radially within the second annular member 76 at a position downstream of the first member 74. The pilot inner air swirler passage 60 comprises the annular duct 60A and the annular duct 60B.

The second annular member 76 has one or more internal fuel passages 62 which are arranged to receive fuel from the first internal fuel passage, the pilot fuel supply passage, 50 in the fuel feed arm 46. The one or more fuel passages 62 are arranged to supply fuel to a fuel swirler 87 which supplies a film of fuel through outlet 62A onto a radially inner surface, a pre-filming surface, 86 at a downstream end 76B of the second annular member 76. A plurality of circumferentially spaced swirl vanes 88 extend radially between the second annular member 76 and the third annular member 78 to form a second air swirler 89. The second annular member 76 has a greater axial length than the third annular member 78 and the third annular member 78 is positioned at the downstream end 76B of the second annular member 76 and a generally annular duct 64A is defined between the second annular member 76 and the third annular member 78 and the swirl vanes 88 extend across the annular duct 64A. The pilot outer air swirler passage 64 comprises the annular duct 64A.

The downstream end 78B of the third annular member 78 comprises a frusto-conical convergent portion 77 and a frusto-conical divergent downstream portion 79. The third annular member 78 has a smoothly curved transition 73, including a throat or minimum diameter 71, from the frusto-conical convergent portion 77 to the frusto-conical divergent downstream portion 79. At least the frusto-conical divergent downstream portion 79 of the downstream end 78B of the third annular member 78 is downstream of the downstream end 76B of the second annular member 76 and the downstream end 76B of the second annular member 76 is downstream of the downstream end 74B of the first member 74. In operation the pilot fuel supplied by internal fuel passages 62 and fuel swirler 87 onto the radially inner surface 86 of the second annular member 76 is atomised by swirling flows of air from the swirl vanes 80 and 88 of the first and second air swirlers 81 and 89 respectively. The pilot inner air swirler passage 60 and the pilot outer air swirler passage 64 are arranged to swirl the air in opposite directions. Alternatively, the pilot inner air swirler passage 60 and the pilot outer air swirler passage 64 may be arranged to swirl the air in the same direction.

The fuel injector head 48 also comprises a fourth generally annular member 94 spaced coaxially around the third annular member 78, a fifth generally annular member 96 spaced coaxially around the fourth annular member 94 and a sixth generally annular member 98 spaced coaxially around the fifth annular member 96. A plurality of circumferentially spaced swirl vanes 100 extend radially between the fourth annular member 94 and the fifth annular member 96 to form a third air swirler 101. The fifth annular member 96 has a greater axial length than the fourth annular member 94 and the fourth annular member 94 is positioned at the downstream end 96B of the fifth annular member 96 and a generally annular duct 68A is defined between the fourth annular member 94 and the fifth annular member 96 and the swirl vanes 100 extend across the annular duct 68A. The main inner air swirler passage 68 comprises the annular duct 68A. The fifth annular member 96 has one or more internal fuel passages 70 which are arranged to receive fuel from the second internal fuel passage 52 in the fuel feed arm 46. The one or more fuel passages 70 are arranged to supply fuel to a fuel swirler (not shown) which supplies a film of fuel through outlet 70A onto the radially inner surface, a pre-filming surface, 102 at the downstream end 96B of the fifth annular member 96. A plurality of circumferentially spaced swirl vanes 104 extend radially between the fifth annular member 96 and the sixth annular member 98 to form a fourth air swirler 105. A generally annular duct 72A is defined between the downstream end 96B of the fifth annular member 96 and the downstream end 98B of the sixth annular member 98 and the swirl vanes 104 extend across the annular duct 72A. The main outer air swirler passage 72 comprises the annular duct 72A. The downstream end 94B of the fourth annular member 94 comprises a frusto-conical divergent downstream portion 95. In operation the main fuel supplied by internal fuel passages 70, fuel swirler and outlet 70A onto the radially inner surface 102 of the fifth annular member 96 is atomised by swirling flows of air from the swirl vanes 100 and 104 of the third and fourth air swirlers 101 and 105 respectively. The main inner air swirler passage 68 and the main outer air swirler passage 72 are arranged to swirl the air in opposite directions. Alternatively, the main inner air swirler passage 68 and the main outer air swirler passage 72 may be arranged to swirl the air in the same direction.

The fuel injector head 48 also comprises a plurality of circumferentially spaced swirl vanes which extend radially between the third annular member 78 and the fourth annular member 94 to form a fifth air swirler. An annular duct is defined between the third annular member 78 and the fourth annular member 94. The intermediate air swirler passage 66 comprises the annular duct. The intermediate air swirler passage 66 is sandwiched between the pilot outer air swirler passage 64 of the inner pilot air-blast fuel injector 54 and the main inner air swirler passage 68 of the outer main air-blast fuel injector 56.

The fourth annular member 94 forms a first splitter member arranged radially between the main inner air swirler passage 68 and the pilot outer air swirler passage 64 and the third annular member 78 forms a second splitter member arranged radially between the main inner air swirler passage 68 and the pilot outer air swirler passage 64. A connecting member 106 is arranged to extend from the downstream end 78B of the second splitter member 78 to the frusto-conical divergent downstream portion 95 of the first splitter member 94 upstream of the downstream end 94B of the first splitter member 94 and the junction of the frusto-conical divergent downstream portion 79 of the second splitter member 78 and the connecting member 106 is arranged to form a sharp edge 108. The downstream end 78B of the second splitter member 78 is arranged upstream of the downstream end 96B of the first splitter member 96, e.g. the sharp edge 108 at the junction of the frusto-conical divergent downstream portion 79 of the second splitter member 78 is arranged upstream of the downstream end 96B of the first splitter member 96. The frusto-conical divergent downstream portion 79 of the second splitter member 78 and the connecting member 106 are arranged at an angle of 90° or less to form the sharp edge 108. The frusto-conical divergent downstream portion 95 of the first splitter member 94 and the connecting member 106 are arranged at an angle of 90° and the frusto-conical divergent downstream portion 79 of the second splitter member 78 and the connecting member 106 are arranged at an angle of 90° to form the sharp edge 108. An annular chamber 91 is defined between the first splitter member 94 and the second splitter member 78.

The second splitter 78 also has a cylindrical upstream portion 75 and the frusto-conical convergent portion 77 is arranged axially between the cylindrical upstream portion 75 and the frusto-conical divergent downstream portion 79. The cylindrical upstream portion is arranged radially around the pilot outer air swirler passage 64 to define the intermediate air swirler passage 66 between the first splitter member 94 and the second splitter member 78.

The frusto-conical divergent downstream portion 95 of the first splitter member 94 and the frusto-conical divergent downstream portion 79 of the second splitter 78 are arranged at the same angle relative to the axis Y of the fuel injector head 48. The frusto-conical divergent downstream portion 79 of the second splitter member 78 and the frusto-conical divergent downstream portion 95 of the first splitter member 94 are arranged parallel to each other. However, the frusto-conical divergent downstream portion 95 of the first splitter member 94 and the frusto-conical divergent downstream portion 79 of the second splitter member 78 may be arranged at different angles relative to the axis Y of the fuel injector head 48.

The connecting member 106 is provided with apertures 110 to supply coolant over a downstream surface of the connecting member 106 and/or the radially inner surface of the frusto-conical divergent downstream portion 95 of the first splitter member 94, as shown in FIG. 3A. The apertures 110 are arranged in a single row and are circumferentially spaced apart. The apertures 110 are arranged as close as possible to the radially inner surface of the frusto-conical divergent downstream portion 95 of the first splitter 94. The axes of the apertures 110 are arranged generally parallel to, or arranged to intersect, the radially inner surface of the frusto-conical divergent downstream portion 95 of the first splitter 94. The remainder of the connecting member 106 is imperforate.

In operation the swirl vanes of the fifth air swirler provide a swirling flow of air through the intermediate air swirler passage 66, e.g. the annular chamber 91, and over the radially inner surface of the first splitter member 94. Some of the swirling flow of air in the annular chamber 91 flows through the apertures 110 in the connecting member 106 and over the radially inner surface of the frusto-conical divergent downstream portion 95 of the first splitter member 94 to cool the downstream surface of the connecting member 106 and the radially inner surface of the frusto-conical divergent downstream portion 95 of the first splitter member 94.

The angle of the frusto-conical divergent downstream portion 79 of the second splitter 78 relative to the axis Y of the fuel injector head 48 controls the formation of the S-shaped recirculation zone in conjunction with the air flows from the air swirlers, which air swirlers or is it both of the pilot air swirlers and both of the main air swirlers. The apertures 110 arranged close to and generally parallel to, or arranged to intersect, the radially inner surface of the frusto-conical divergent downstream portion 95 of the first splitter 94 to aid the formation of the S-shaped recirculation zone.

The sharp edge 108 at the junction of the frusto-conical divergent downstream portion 79 of the second splitter member 78 and the connecting member 106 ensures that the fuel and air flow from the inner pilot air-blast fuel injector 54 separates from the frusto-conical divergent downstream portion 79 of the second splitter member 78 at the angle of the frusto-conical divergent downstream portion 79 of the second splitter member 78 relative to the axis Y and the positioning of the downstream end 78B of the second splitter member 78 upstream of the downstream end 94B of the first splitter member 94 provides a region for the S-shape recirculation to occur prior to the fuel and air mixture from the inner pilot air-blast fuel injector 54 combining with the fuel and air mixture from the outer main air-blast fuel injector 56.

The diameter of the throat 71, the radius of the smoothly curved transition 73 and the separation distance between the downstream end 76B of the second annular member 76 and the frusto-conical convergent portion 77 of the second splitter member 78 control the flow of air through the pilot outer air swirler passage 64 and hence control the ratio of the air flow through the pilot outer air swirler passage 64 to the air flow through the pilot inner air swirler passage 60.

Although the lean burn fuel injector 44 has been described as having cooling apertures 110 only in the connecting member 106 it may be equally possible that the connecting member 106 is not provided with cooling apertures if the connecting member 106 and the first splitter member 94 comprise high temperature and corrosion resistant material, a metal, e.g. a nickel base superalloy, a cobalt base superalloy or an iron base superalloy, a ceramic or a ceramic matrix composite, or has a high temperature and corrosion resistant coating. An alternative cooling arrangement comprises a perforate member located within the chamber 91 to provide impingement cooling of the connecting member 106 in addition to the cooling apertures 110 in the connecting member 106.

Figure 3B:
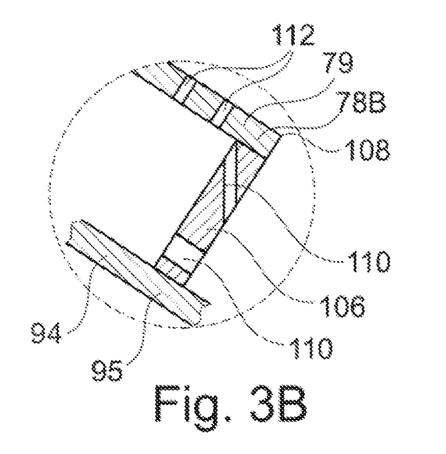
FIG. 3B is an alternative enlarged portion of a part of the lean burn fuel injector shown in FIG. 3.

An alternative cooling arrangement is shown in FIG. 3B and this has cooling apertures 110 and 111 in the connecting member 106 and cooling apertures 112 in the frusto-conical divergent downstream portion 79 of the second splitter 78 respectively. As mentioned previously the apertures 110 are arranged in a single row and are circumferentially spaced apart. The apertures 110 are arranged as close as possible to the radially inner surface of the frusto-conical divergent downstream portion 95 of the first splitter 94. The axes of the apertures 110 are arranged generally parallel to the radially inner surface of the frusto-conical divergent downstream portion 95 of the first splitter 94. The axes of the apertures 111 are arranged to intersect the radially inner surface of the frusto-conical divergent downstream portion 95 of the first splitter 94. The remainder of swirling flow of air in the annular chamber 91 flows through the apertures 112 in the frusto-conical divergent downstream portion 79 of the second splitter 78 to cool the radially inner surface of frusto-conical divergent downstream portion 79 of the second splitter 78.

An alternative cooling arrangement comprises a perforate member located within the chamber 91 to provide impingement cooling of the connecting member 106 and the frusto-conical divergent downstream portion 79 of the second splitter 78 in addition to the cooling apertures 110 and 111 in the connecting member 106 and the apertures 112 in the frusto-conical divergent downstream portion 79 of the second splitter 78. Another alternative cooling arrangement with cooling apertures 112 in the frusto-conical divergent downstream portion 79 of the second splitter 78 only comprises a perforate member located within the chamber 91 to provide impingement cooling of the frusto-conical divergent downstream portion 79 of the second splitter 78 in addition to cooling apertures 112 in the frusto-conical divergent downstream portion 79 of the second splitter 78.

Figure 4:
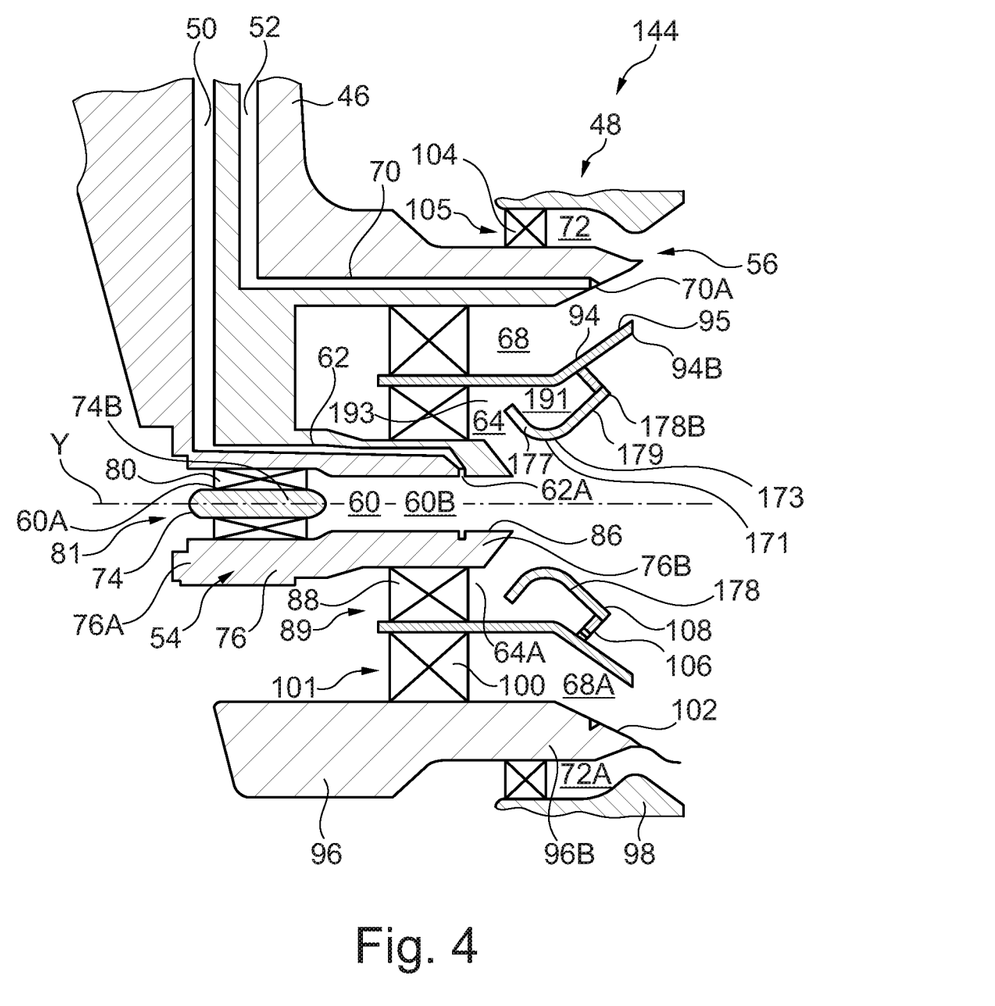
FIG. 4 is a further enlarged cross-section view of an alternative lean burn fuel injector according to the present disclosure.

An alternative lean burn fuel injector 144 according to the present disclosure is shown more clearly in FIG. 4. The lean burn fuel injector 144 is substantially the same as the lean burn fuel injector 44 shown in FIG. 3 and like parts are denoted by like numerals. The lean burn fuel injector 144 differs in that it does not have an intermediate air swirler passage sandwiched between the pilot outer air swirler passage 64 of the inner pilot air-blast fuel injector 54 and the main inner air swirler passage 68 of the outer main air-blast fuel injector 56. The lean burn fuel injector 144 has a third annular member, a second splitter member, 178 which comprises a frusto-conical convergent portion 179 and a frusto-conical divergent downstream portion 179 and a smoothly curved transition 173 including a throat or minimum diameter 71, but does not have a cylindrical portion at its upstream end. A plurality of circumferentially spaced swirl vanes 88 extend radially between the second annular member 76 and the fourth annular member 94 to form the second air swirler 89. The second splitter member 178 is arranged downstream of the second air swirler 89, the air swirler in the pilot outer air swirler passage 64 and an upstream end of the frusto-conical convergent portion 179 of the second splitter member 178 is spaced radially from the first splitter member 94 to define an inlet 193 to an annular chamber 191 defined between the first splitter member 94 and the second splitter member 178.

The lean burn fuel injector 144 may have cooling apertures 110 in the connecting member 106 only as described above as shown in FIG. 3A. It may be equally possible to provide cooling apertures 112 only in the frusto-conical divergent downstream portion 79 of the second splitter 78. It may be possible to provide cooling apertures 110 and 111 in the connecting member 106 and cooling apertures 112 in the frusto-conical divergent downstream portion 79 of the second splitter 78, as shown in FIG. 3B. Alternatively, neither the connecting member 106 nor the frusto-conical divergent downstream portion 79 of the second splitter 78 are provided with cooling apertures if the connecting member 106 and the second splitter member 78 comprise high temperature and corrosion resistant material, a metal, e.g. a nickel base superalloy, a cobalt base superalloy or an iron base superalloy, a ceramic or a ceramic matrix composite, or has a high temperature and corrosion resistant coating.

An alternative cooling arrangement comprises a perforate member located within the chamber 91 to provide impingement cooling of the connecting member 106 and the frusto-conical divergent downstream portion 79 of the second splitter 78 in addition to the cooling apertures 110 and 111 in the connecting member 106 and apertures 112 in the frusto-conical divergent downstream portion 79 of the second splitter 78. An alternative cooling arrangement comprises a perforate member located within the chamber 91 to provide impingement cooling of the connecting member 106 in addition to the cooling apertures 110 in the connecting member 106. Another alternative cooling arrangement comprises a perforate member located within the chamber 91 to provide impingement cooling of the frusto-conical divergent downstream portion 79 of the second splitter 78 in addition to cooling apertures 112 in the frusto-conical divergent downstream portion 79 of the second splitter 78.

The lean burn fuel injector 144 operates in substantially the same way as the lean burn fuel injector 44 described above.

The lean burn fuel injector 144 has a simpler in construction with one less air swirler and thus is easier and cheaper to manufacture and has less weight than the lean burn fuel injector 44. The lean burn fuel injector 144 may have a smaller overall outer diameter, e.g. the outer diameter of the sixth annular member 98, than the lean burn fuel injector 44.

The lean burn fuel injectors of the present disclosure comprise a second splitter which has a frusto-conical divergent portion which has a sharp edge at its downstream end from which the fuel and air mixture from the inner pilot air-blast fuel injector is shed and the second splitter is cooled to prevent oxidation. The sharp edge at the downstream end of the frusto-conical divergent portion of the second splitter is located upstream of the downstream end of the first splitter to provide a region for stabilisation of the S-shaped recirculation zone before the fuel and air mixture inner pilot air-blast fuel injector mixes with the fuel and air mixture outer main air-blast fuel injector. The axes of any apertures in the connecting member must be arranged parallel to, or arranged to intersect, the radially inner surface of the first splitter, e.g. all the apertures in the connecting member are arranged parallel to, or arranged to intersect, the radially inner surface of the first splitter. The axes of the apertures in the connecting member closest to the first splitter are arranged parallel to, or are arranged to intersect, the radially inner surface of the first splitter and the axes of the apertures more remote from the first splitter are arranged to intersect the radially inner surface of the first splitter to aid the formation of the S-shaped recirculation zone. It has been found that the use of apertures in the connecting member remote from the first splitter which are parallel to the radially inner surface of the first splitter or direct coolant away from the radially inner surface of the first splitter disrupt the formation of the S-shaped recirculation zone.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A lean burn fuel injector comprising a fuel feed arm and a fuel injector head,
    the fuel feed arm having a pilot fuel supply passage extending there-through and a main fuel supply passage extending there-through,
    the fuel injector head having a coaxial arrangement of an inner pilot air-blast fuel injector and an outer main air-blast fuel injector, the outer main air-blast fuel injector being arranged coaxially radially outwardly of the inner pilot air-blast fuel injector,
    the inner pilot air-blast fuel injector comprising, in order radially outwardly, a coaxial arrangement of a pilot inner air swirler passage and a pilot outer air swirler passage, the pilot fuel supply passage being arranged to supply pilot fuel into at least one of the pilot inner air swirler passage or the pilot outer air swirler passage,
    the outer main air-blast fuel injector comprising, in order radially outwardly, a coaxial arrangement of a main inner air swirler passage and a main outer air swirler passage, the main fuel supply passage being arranged to supply main fuel into at least one of the main inner air swirler passage or the main outer air swirler passage,
    a first splitter member being arranged radially between the main inner air swirler passage and the pilot outer air swirler passage, the first splitter member having a frusto-conical divergent downstream portion,
    a second splitter member being arranged radially within and radially spaced from the first splitter member, the second splitter member comprising a frusto-conical convergent portion and a frusto-conical divergent downstream portion, a downstream end of the second splitter member being arranged upstream of a downstream end of the first splitter member,
    a connecting member that defines a major axis that extends from a first end to a second end of the connecting member, and wherein the major axis extends radially outward and in an upstream direction from the downstream end of the second splitter member to the frusto-conical divergent downstream portion of the first splitter member upstream of the downstream end of the first splitter member and the frusto-conical divergent downstream portion of the second splitter member and the connecting member being arranged to form a sharp edge, wherein the downstream end of the second splitter member and the connecting member are arranged at an angle of 90° or less to define the sharp edge.

2. The lean burn fuel injector as claimed in claim 1, wherein the frusto-conical divergent downstream portion of the first splitter member and the connecting member are arranged at an angle of 90°.

3. The lean burn fuel injector as claimed in claim 1, wherein the frusto-conical divergent downstream portion of the second splitter member and the frusto-conical divergent downstream portion of the first splitter member are arranged parallel to each other.

4. The lean burn fuel injector as claimed in claim 1, wherein the connecting member is provided with apertures to supply coolant over at least one of a downstream surface of the connecting member and the frusto-conical divergent downstream portion of the first splitter member.

5. The lean burn fuel injector as claimed in claim 4, wherein axes of the apertures are arranged parallel to, or are arranged to intersect, a radially inner surface of the frusto-conical divergent downstream portion of the first splitter member.

6. The lean burn fuel injector as claimed in claim 4, wherein axes of a first set of apertures closer to the first splitter member are arranged parallel to a radially inner surface of the frusto-conical divergent downstream portion of the first splitter member and axes of a second set of apertures further from the first splitter member are arranged to intersect the radially inner surface of the frusto-conical divergent downstream portion of the first splitter member.

7. The lean burn fuel injector as claimed in claim 1, wherein the frusto-conical divergent downstream portion of the second splitter member is provided with apertures to supply coolant over a radially inner surface of the frusto-conical divergent downstream portion of the second splitter member.

8. The lean burn fuel injector as claimed in claim 1, wherein the second splitter member has a cylindrical upstream portion, the frusto-conical convergent portion being arranged axially between the cylindrical upstream portion and the frusto-conical divergent downstream portion, the cylindrical upstream portion is arranged radially around the pilot outer air swirler passage to define an intermediate air swirler passage between the first splitter member and the second splitter member.

9. The lean burn fuel injector as claimed in claim 1, wherein the second splitter member is arranged downstream of an air swirler in the pilot outer air swirler passage, an upstream end of the frusto-conical convergent portion of the second splitter member is spaced radially from the first splitter member to define an inlet to a chamber between the first splitter member and the second splitter member.

10. The lean burn fuel injector as claimed in claim 1, wherein the pilot fuel supply passage is arranged to supply pilot fuel into the pilot inner air swirler passage.

11. The lean burn fuel injector as claimed in claim 1, wherein a pilot fuel passage is arranged coaxially between the pilot inner air swirler passage and the pilot outer air swirler passage.

12. The lean burn fuel injector as claimed in claim 11, wherein the pilot fuel passage is arranged to supply pilot fuel onto a pre-filming surface in the pilot inner air swirler passage.

13. The lean burn fuel injector as claimed in claim 12, wherein the pilot fuel passage has a fuel swirler to swirl the pilot fuel supplied onto the pre-filming surface in the pilot inner air swirler passage.

14. The lean burn fuel injector as claimed in claim 1, wherein the pilot inner air swirler passage and the pilot outer air swirler passage are arranged to swirl air in opposite directions.

15. The lean burn fuel injector as claimed in claim 1, wherein the main fuel supply passage is arranged to supply the main fuel into the main inner air swirler passage.

16. The lean burn fuel injector as claimed in claim 1, wherein a main fuel passage is arranged coaxially between the main inner air swirler passage and the main outer air swirler passage.

17. The lean burn fuel injector as claimed in claim 16, wherein the main fuel passage is arranged to supply main fuel onto a pre-filming surface in the main inner air swirler passage.

18. The lean burn fuel injector as claimed in claim 1, wherein the main inner air swirler passage and the main outer air swirler passage are arranged to swirl air in opposite directions.

19. The lean burn fuel injector as claimed in claim 1, wherein an intermediate air swirler passage is sandwiched between the pilot outer air swirler passage of the inner pilot air-blast fuel injector and the main inner air swirler passage of the outer main air- blast fuel injector.

* * * * *